June 23, 1970 R. F. LIPPOLDT ET AL 3,516,196
MULCH SHEETS AND SEED MATS AND METHOD OF MAKING SAME
Original Filed Nov. 27, 1964

INVENTORS
RICHARD F. LIPPOLDT
WARREN W. WOODS
BY

*Gerald L. Floy*
ATTORNEY

United States Patent Office 3,516,196
Patented June 23, 1970

3,516,196
MULCH SHEETS AND SEED MATS AND
METHOD OF MAKING SAME
Richard F. Lippoldt and Warren W. Woods, Ponca City, Okla., assignors to Continental Oil Company, Ponca City, Okla., a corporation of Delaware
Original application Nov. 27, 1964, Ser. No. 414,106, now Patent No. 3,427,194, dated Feb. 11, 1969. Divided and this application July 8, 1968, Ser. No. 760,370
Int. Cl. A01c 1/04
U.S. Cl. 47—56
4 Claims

ABSTRACT OF THE DISCLOSURE

A seed mat is comprised of a biodegradable sheet coated with an asphalt adhesive binding seeds to the upper surface of the biodegradable sheet.

---

This application is a division of Ser. No. 414,106, filed Nov. 27, 1964, now Pat. No. 3,427,194.

This invention relates to mulching materials and seed mats for use in agriculture for selectively promoting the growth of certain plant types. More particularly, the present invention pertains to agricultural mulches and seed mats of the type comprising sheets of a fibrous substrate which has been in some manner treated with a bituminous composition, and to the methods of manufacturing mulches and seed mats of this type.

It is now well established that certain types of paper or fibrous mulches can afford marked benefit in enhancing the growth of certain plants while suppressing undesirable growth of different types, such as woods and the like. Elongated strips of untreated paper were initially used as mulch materials and functioned well for short periods of time. However, the paper often rotted or disintegrated prior to the end of the growing season, and also had other defects or disadvantages which rendered its use of marginal value in many circumstances.

It was next proposed to coat or impregnate paper or fibrous strips with some type of flexible, water-repellent, resinous or semi-plastic material, such as tar or asphalt. This improved the water retention in the soil and the amount of heat absorption and insulation afforded by the mulch. One of the problems which was engendered by impregnating the paper or fibrous stock with asphalt or tar, however, was that of disposing of the mulch paper after the growing season when it was desirable to plow under the stubble or otherwise prepare the field for the next season. Although the untreated paper mulches had been sufficiently biodegradable that they were easily disintegrated and consumed by soil organisms by the end of the harvest to avoid this problem, asphalt impregnation apparently reinforced the paper and made it sufficiently unpalatable to soil organism that it remained substantially intact in the field beyond the period of its usefulness. Moreover, the tendency of the asphalt to block at high temperatures, and the inability to flex upon rolling or bending over small radii made handling and storage of long strips of this type of mulch difficult.

More recently, two techniques of mulching have been proposed which are basic departures from the types of mulches which employ paper or fibrous stock, either alone, or treated with a suitable material for improving certain of the properties of the paper. In one of these, asphalt emulsions are sprayed on the soil directly over the seed row. The main advantages of this type of mulching procedure are that it is relatively economical compared to other mulches, and that the asphaltic particles can be easily plowed under after each crop has matured without detriment to the soil.

In the other type of mulching procedure currently in wide-spread use, sheets of thin, black polyethylene film are used. The film is about 1.25 mils thick and is applied in strips about twenty inches wide over the seed row. Since the plastic is not attacked or consumed by soil organisms, it is necessary to gather up the plastic sheets after use and burn them, and the total cost of the mulching operation is thereby substantially increased.

The present invention comprises a new type of mulch which possesses the desirable qualities attributable to the earlier asphalt-impregnated paper mulches, but which is not characterized by the disadvantages which previously characterized this type of mulch. Moreover, the mulches of this invention can be manufactured susbtantially more economically than polyethylene film mulches, and in certain embodiments, can be made slightly less expensively than the previously used asphalt- or tar-coated paper mulches. Moreover, the mulches of the present invention are considerably more effective in promoting crop growth than the sprayed-on asphalt emulsions and last longer than such emulsions, which tend to disintegrate too early in the growing season to provide protection for slow growing crops.

In another aspect, the present invention comprises a novel seed mat containing in-situ seeds which are carried by a porous, fibrous substrate.

More specifically described, the present invention comprises a fibrous matrix or substrate of a porous, biodegradable material, such as cellulose, which has applied thereto a relatively thin layer or coating of a bitumin-containing material. In one embodiment, seeds are placed upon, or embedded in, the fibrous matrix before covering the matrix with the bitumin-containing material. The relationship of the coating of bitumin-containing material to the substrate is of some critically, it being desirable to limit the thickness of the coating to less than 3.5 mils in the case of the mulch and less than about 6 mils in the case of the seed mats. It is also important to prevent penetration of the coating material into the pores or interstices of the substrate more than is necessary to assure good adhesion of the coating to the fibrous stock. To the end of accomplishing the preferred relationship between the fibrous matrix and the bitumin-containing coating, a novel method of fabricating the mulches of the invention is proposed and broadly comprises establishing a thin, gravitating film of the molten bitumin-containing composition and passing the substrate through the film under conditions to lay down thereon a coating of the desired thickness and depth of penetration.

The major advantages which accrue from the described relationship of the coating material to the substrate are economy in materials savings and improved disposability of the mulch after it has served its purpose. The mulches made by the preferred method of fabrication appear to be more readily attacked by microorganisms in the soil which attack and substantially entirely consume the paper substrate over the course of most growing seasons. The bituminous coating, then lacking support, disintegrates easily and can be plowed under the soil with no difficulty. Apparently, the shallow penetration of the coating material into the paper or cellulosic substrate permits better access by cellulose-consuming bacteria, so that the substrate can be more quickly destroyed.

Additionally, the described gravitating curtain method of applying the coating to the substrate results in a more uniform coating with fewer discontinuities, cracks or breakthroughs which weaken the mulch mechanically or permit moisture to escape from the earth.

The fibrous substrate can be substantially any porous, biodegradable material having mechanical properties similar to paper and can typically be either paper or cloth. The bitumin-containing coating composition can be a pure asphaltic material, but is preferably a composition comprising asphalt and from about 1 percent by weight to about 30 percent by weight of an asphalt extendible copolymer. The asphalt extendible copolymer imparts greater flexibility and mechanical strength to the bitumin and also increases the moisture-retention properties of the mulch. It also assists in preventing blocking of the coating when the mulch is rolled up for storage and transport.

From the foregoing description of the invention, it will have become apparent that it is a major object of the present invention to provide a novel agricultural mulch having improved mulching characteristics, and which may be relatively economically manufactured.

Another object of the invention is to provide an improved seed mat for growing plants from an artificial mulch-type environment.

An additional object of the present invention is to provide a novel and improved method for manufacturing mulches of the type having a fibrous, biodegradable substrate with a coating of a bituminous composition applied to such substrate.

A more specific object of the present invention is to prepare an agricultural mulch of the type having a paper matrix or substrate carrying a thin coating of a bitumin-containing composition, and which undergoes degradation or decomposition by soil organisms more rapidly than mulches of this general character which have been previously manufactured.

An additional object of the present invention is to provide a novel mulch material for use in enhancing plant growth which attains the advantages heretofore characteristic of asphaltic-type mulches, but which demonstrates improved physical properties including better blocking properties, improved flexibility, and better moisture-retention.

A further object of the present invention is to provide a method for manufacturing agricultural mulches of the type having a paper or fibrous substrate coated or impregnated with asphaltic compositions, which method permits the asphaltic or bitumin-containing composition to be more uniformly applied to the substrate with less penetration of the substrate and better control of the thickness of the asphaltic layer being affected.

An additional object of the present invention is to provide an agricultural mulch which is at least comparable in performance with sheet polyethylene mulch, but which can be manufactured more economically, and which is more readily disposed of at the end of the growing season than sheet polyethylene-type mulches.

In addition to the foregoing described objects and advantages, additional objects and advantages will become apparent as the following detailed description of the invention is read in conjunction with the accompanying drawings which illustrate various aspects of the invention.

Figure 2:
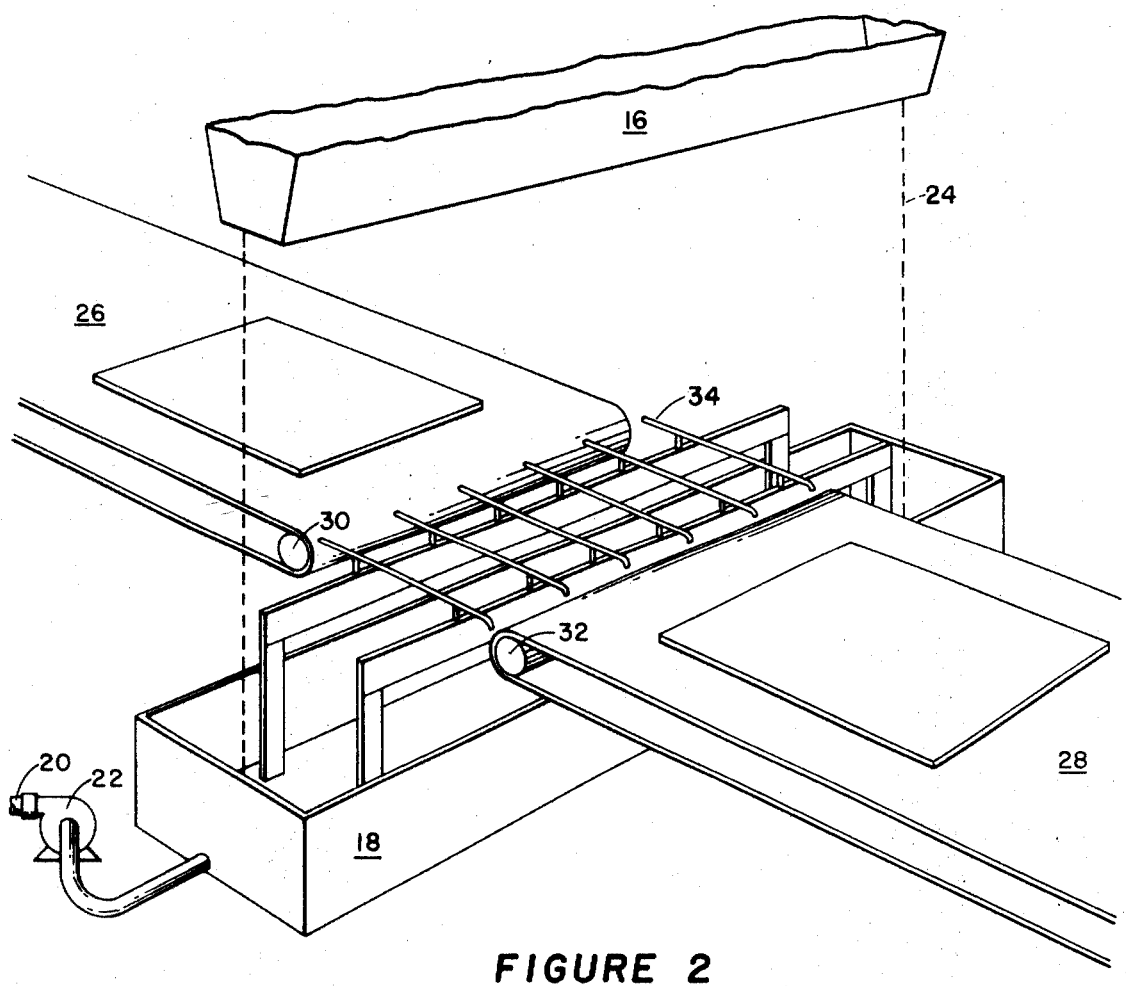
FIG. 2 is a perspective, partially schematic, illustration of an apparatus which can be used in practicing the novel method used for fabricating the agricultural mulches and seed mats of the invention.

Considering first some of the salient considerations which are important in the practice of the present invention, the type of matrix or substrate which is employed will initially be discussed. Some properties of the substrate are relatively critical and others are desirable. The substrate should be sufficiently weak mechanically to permit penetration by plant shoots in those instances where penetration of the mulch by the growing plants is to occur, rather than holes being provided in the mulch to accommodate the growing plants. It is essential that the substrate be a biodegradable material which can be decomposed or degraded by naturally occurring soil organisms over the growing season. On the other hand, the substrate should be sufficiently strong mechanically to withstand stresses imposed during the coating process and during shipment and handling. It is also necessary that it be sufficiently durable to resist erosion and disintegration by moisture and other elements during the major portion of the growing season. In the seed mat embodiments of the invention, it is desirable that the substrate material have relatively good moisture absorption properties.

Since cellulose consuming bacteria are indigenous to most soils, porous cellulosic matrices or substrates can be satisfactorily used in the practice of the invention. Paper and cloth constitute preferred materials with the most preferred substrate being newsprint or the cheapest paper which is available. Other types of fibrous substrate materials of animal or vegetable origin can also be employed, and the substrate materials used for the invention are not limited to cellulosic materials. In the case of mulch materials of the seed mat-type, draped kraft paper is preferred in that this material permits the seeds to be retained in their desired position better than smooth surfaced papers. This paper is also highly adsorbent, thus allowing moisture from the soil to readily contact the seeds through the underneath, i.e., non-bituminous-coated side of the seed mat and aid in seed germination. In contrast, the paper or other substrate for preparation of an agricultural mulch may be, but does not have to be, adsorbent.

The bitumin-containing composition which is applied to the fibrous substrate can be a purely asphaltic material, bar preferably is an asphaltic composition containing a major portion of asphalt and up to about 30 percent by weight of a copolymeric material which is compatible with the asphalt and imparts certain desirable properties to the coating, particularly, suppression of the blocking characteristic, improvement in flexibility, enhanced adherence to the substrate and better moisture-retention properties.

The asphalt employed must meet several functional requirements. It must yield a coating which is flexible enough not to chip or crack when rolled and unrolled or handled. It must not block or adhere in the roll, either in storage or when exposed to direct sunlight in the field. In warehouse storage and in direct exposure to sunlight, summer temperatures as high as 120° F. can be expected. Consequently, the asphalt-containing coating should not block at temperatures as low as 120° F. We have found that an air blown asphalt derived from a cracked petroleum stock and having a softening point of from about 175° F. to 190° F., as determined by ASTM–D–36, and a penetration test value at 77° F. of from 1 to 10 decimillimeters as determined by ASTM–D–5, is especially well suited for use in the invention and demonstrates little or no blocking at temperatures as high as 140° F.

In a preferred coating composition which can be used in the invention, asphalt of the preferred type (softening point 175° F. to 190° F. and penetration at 77° F. of between 1 and 10) is blended with from about 1 percent by weight to about 30 percent by weight of an asphalt extendible copolymer of the ethylene-vinyl acetate type. Preferably, the composition contains from about 3 to about 15 percent of the ethylene-vinyl acetate copolymer. Ethylene-vinyl acetate copolymers are sold under the tradename Elvax by E. I. du Pont de Nemours Company Wilmington, Del., and typical properties of some of the various grades of Elvax which are marketed are as follows.

| Copolymer | Elvax 150 | Elvax 220 | Elvax 240 | Elvax 250 |
|---|---|---|---|---|
| Comonomer ratio, wt. percent (ethylene:vinyl acetate) | 66:34-68:32 | 73:27-71:29 | 73:27-71:29 | 73:27-71:29 |
| Melt index (ASTM D-1238-57T) | 22-28 | 125-175 | 22-28 | 12-18 |
| Refractive index, $N_D^{25}$ | 1.485 | 1.485 | 1.485 | 1.482 |
| Density at 30° C. grams/cc | 0.95 | 0.95 | 0.95 | 0.95 |
| Softening point (ring and ball), °F | 243 | 192 | 307 | 278 |
| Inherent viscosity, cp. at 30° C.[1] | 0.77 | 0.63 | 0.78 | 0.85 |
| Molecular weight | 300,000 | 150,000 | 225,000 | 400,000 |
| Tensile strength, p.s.i.[2] | 1,000 | 460 | 2,000 | 2,000 |
| Elongation at break, percent [2] | 700 | 650 | 850 | 750 |

[1] Determined using a solution of 0.25 weight percent copolymer in toluene.
[2] Crosshead speed of ½ inch per minute and a sample length of 1-inch (ASTM D-882-56T).

The ethylene-vinyl acetate copolymers used in the asphalt blends of this invention preferably exhibit melt indices ranging from about 3 to about 30, and preferably have a vinyl acetate content ranging from about 25 percent by weight to about 35 percent by weight. It is further preferred that this copolymer have a tensile strength as determined as ASTM-D-882-50T exceeding 1000 p.s.i. The Elvax 250 described in the foregoing table of properties is an especially suitable material.

In addition to the ethylene-vinyl acetate copolymers, other asphalt extendible copolymers such as ethylene-ethyl acrylate, can also be employed and are used in substantially the same proportions as has been described as a characteristic of the blends of asphalt and ethylene-vinyl acetate copolymer. Ethylene-ethyl acrylate copolymers are sold under the tradename Zetafin 70A1 by the Dow Chemical Company of Midland, Mich. Of the ethylene-ethyl acrylate copolymers which can be employed, the preferred species are characterized by the following typical properties:

| | |
|---|---|
| Melt index [1] | 2.5 to 20.1 |
| Ethyl acrylate, wt. percent | 15 to 20 |
| Tensile strength, p.s.i. [2] | 1100 to 2000 |
| Elongation at break, percent [2] | 670 to 810 |
| Density 30° C., grams cc. | 0.924 to 0.944 |
| Brittle point, ° C. | −70° |
| Hardness, shore "D" [3] | 30 to 40 |

[1] ASTM D-1238-57T.
[2] ASTM D-412-57T at 2" per minute crosshead speed.
[3] ASTM D-1706-57T.

The preference for the use of the copolymer containing blends for coating the fibrous substrate is based upon the improved properties which characterize the coatings derived therefrom. Thus, these coatings appear to adhere more tenaciously to the substrate than pure asphaltic coatings, and an improvement in the blocking characteristics of the coatings is also realized. Moreover, the flexibility of the coating is improved, permitting the mulch to be easily rolled without cracking and chipping, or bent through relatively small angles without cracking or destruction of the integrity of the coating. This improvement is particularly evidenced when the amount of copolymer in the blend exceeds about 7 weight percent. The described copolymer materials form a homogeneous blend or sol with the asphalt, and do not present any problems in handling. The blends are particularly well adapted for use in the curtain coating or gravitating film method of manufacturing mulches hereinafterdescribed. Further, from limited available evidence, the inclusion of the copolymer appears to slightly reduce the depth to which significant quantities of the coating composition penetrate into the substrate. The importance of this property is deserving of some discussion.

The physical and geometric relationship of the bitumin-containing coating to the fibrous substrate is an important feature in the present invention, particularly with respect to the embodiment of the invention in which a pure asphaltic coating is utilized. In order to permit optimum biological decomposition of the fibrous substrate by the soil organisms, it is believed desirable that the depth of penetration of the coating into the substrate be minimized. The subsequently described examples will illustrate the basis for this belief. Some penetration is, of course, required in order to attain the necessary adhesion of the coating to the substrate. However, beyond the attainment of a satisfactory degree of adhesion, further penetration into the substrate is undesirable economically, and also appears to deter the decomposing activity of soil organisms in proportion to the depth of penetration.

Figure 1:
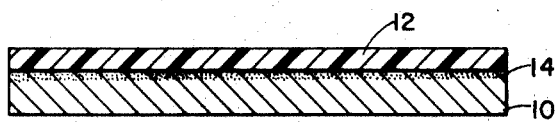
FIG. 1 is a transverse sectional view through a strip of the novel agricultural mulch of the present invention, showing the relationship of the substrate and the coating which is applied thereto.

In the case of the mulch embodiments of the invention, as opposed to the seed mats, it is further desirable that the thickness of the coating on the substrate be between 0.5 and 3.5 mils and preferably not exceed 2.5 mils. Limitation of the coating thickness is obviously desirable from an economic standpoint. Further, however, excessive thickness of the coating increases greatly the weight of the mulch when it is rolled into large rolls for transport or storage, and renders more difficult the breaking up or disintegration of the asphaltic coating after the growing season is terminated and the paper substrate has been disintegrated or decomposed by the soil organisms. The typical geometric relationship of the coating to the substrate is illustrated in FIG. 1 of the drawings, wherein reference character 10 designates a newsprint paper substrate about 4 mils thick which has been coated with an asphalt coating 12 having a thickness of about 2 mils. The paper 10 has a discolored zone 14 adjacent the coated surface which indicates the maximum distance any portion of the coating composition has penetrated into the paper. This distance preferably does not exceed about one fiber layer, or approximately 10 percent of the total thickness of the substrate (0.4 mil). However, a more meaningful criterion of the penetration is the amount or weight of the coating composition which penetrates the paper. Preferably this does not exceed 30 weight percent of the total amount of coating composition applied, and most preferably is less than 10 percent of the total weight of the composition.

Although it has previously been proposed to provide mulches comprising paper or other types of fibrous substrate impregnated or saturated with bituminous compositions, and has further been proposed in broad terms to coat such substrates with asphalt, no specific consideration has been given to the criticality of the relationship between the position and thickness of the coating with reference to the substrate. Such coatings and impregnations have been accomplished by a number of techniques, including spraying, dipping, and applications with doctor blades and brushes. Necessarily, many of these techniques result in coatings which are thicker than desirable, or which completely saturate or deeply penetrate the substrate, or which are not uniform over the entire areal surface of the substrate, and therefore do not transmit evenly the warmth absorbed from the sun to the soil beneath the mulch, and do not retain in a uniform manner, the moisture in the soil beneath the mulch.

One of the novel and important aspects of the present invention is the highly effective technique which is proposed for applying bitumin-containing compositions to the fibrous substrate in manufacturing the mulches of the invention. The proposed procedure entails developing a thin, gravitating film or curtain of the molten coating composition, and passing the substrate at a uniform rate of speed through the curtain at a point sufficiently removed from the source or origin of the curtain to provide a uniform coating of the desired thickness on the substrate. An apparatus which has been effectively employed for this purpose is depicted schematically in FIG. 2 of the drawings. Such apparatus is commercially available and is known to industry as the "Steinemann Curtain Coater." Although curtain coating devices have heretofore been utilized for applying various types of coatings to paper stocks or substrates, we believe we are the first to propose the application of predominantly asphaltic compositions to a fibrous substrate with the curtain coating technique for the purpose of providing an improved agricultural mulch.

Referring to FIG. 2, the curtain coating machine includes a coating head 16, from which originates the gravitating curtain of the coating composition, and a trough 18 which receives the composition and permits it to be recirculated to the head via a conduit 20 by means of a pump 22. The gravitating curtain of the bitumin-containing coating is represented by dashed lines and is designated by reference character 24. Spaced above the trough 12 and occupying substantially the same horizontal plane are a pair of conveyors designated by reference characters 26 and 28. The conveyor 26 may be termed the input or feed conveyor, and one simple form may comprise a wide belt which passes around a roller 30 positioned adjacent the gravitating curtain 24 and slightly to one side thereof. The conveyor 28 may be designated the discharge conveyor and also comprises a wide belt which passes around a roller 32 positioned adjacent the gravitating curtain 24 and on the opposite side thereof from the roller 30. The conveyors 26 and 28 are aligned so that the fibrous substrate may be moved into the curtain 24 on the feed conveyor 26 and picked up and discharged on the conveyor 28. A grill 34 is supported in the trough 18 and supports the substrate as it moves through the curtain 24. Where extremely long, continuous sheets of the fibrous substrate are to be coated with the bitumin-containing composition, the conveyors 26 and 28 will not be used to move the substrate through the gravitating curtain. Instead, a feed roll and take up roll (not shown) may be disposed on opposite sides of the curtain at a substantial distance therefrom, and may be used to pass the substrate material through the curtain.

In applying the asphaltic coatings of the present invention by the preferred curtain coating technique, the composition is heated to a temperature within the range of from about 225° F. to about 325° F., and preferably from about 280° F. to 305° F. These temperature ranges will generally apply equally well to the pure asphaltic coating composition, or to blends of the asphalt with asphalt extendible copolymers because of the relatively small proportion of copolymer which is normally present.

In order to achieve the thin, uniform coating with only slight penetration which is highly preferred in the mulches of the present invention, several factors must be considered in the current coating procedure. These include the speed at which the substrate is passed through the curtain, this viscosity and temperature of the molten composition and the circulation rate of the coating composition through the closed system. The height of the coating head above the plane occupied by the substrate as it is passed through the curtain and the width of the slot in the coating head are of minor importance.

The substrate may be moved through the curtain at speeds ranging from about 400 feet per minute up to 2000 feet per minute for the purpose of applying coatings ranging from about 0.5 mil up to about 3.5 mils when employing normal composition recirculation rates in the curtain coating device of from about 5 lbs. per minute to about 30 lbs. per minute. The coating head will normally be spaced a distance of from about five to ten inches above the substrate and preferably six to seven inches. The slot in the coating head from which the curtain originates is preferably about 0.125 inch in width. Using the described curtain coating technique, we have found that a penetration of the bitumin-containing composition into the substrate does not exceed about 0.5 mil when the curtain coating is carried out under the prescribed conditions.

Figure 3:
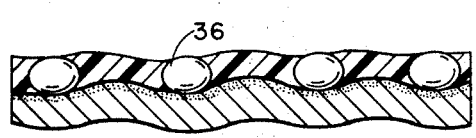
FIG. 3 is a transverse sectional view through a seed mat constructed in accordance with the teachings of the present invention.

Before referring to specific examples of the particles of the invention for purposes of further clarifying its salient features and important advantages, one further aspect of the invention should be considered. This is the embodiment of the invention which comprises the preparation of improved seed mats employing the basic principles of the invention with slight modifications in hereinbefore prescribed procedures, primarily with respect to the type of substrate material which is utilized, and the thickness of the coating which is applied. This aspect of the invention comprises the preparation of a seed mat which contains seeds embedded in or positioned on the surface of the fibrous matrix or substrate, and retained in position by the coating which is applied to the substrate. In the preparation of such seed mats, a creped or wrinkled kraft paper is preferably utilized since the seeds will remain in undulations or depressions on the creped paper and will not readily shift on the surface of the paper during the coating operation. This type of seed mat is illustrated in cross-section in FIG. 3 of the drawings. As an alternative embodiment, the seeds may be embedded in a thin web of fibrous material which is then coated with the bitumin-containing composition. The embedding of the seeds prevents their shifting from the desired location in the substrate, and allows the coating to be applied more smoothly and uniformly. In either arrangement, it is desirable that the seeds 36 not be completely surrounded or enveloped by the coating material so that interference with germination of the seeds and their projection of root systems through the substrate result. We have found that, not only should the bottom of the seed which is in contact with the substrate not be coated with the asphaltic material, but it is also preferable to apply the coating in a sufficiently thin layer that the top of the seed 36 is uncoated and exposed as shown in FIG. 3. For a reason which is not clear, better exposure of the upper surface of the seeds in obtained when blends containing about 10 weight percent of the copolymer are used, rather than pure asphalt, or blends containing a lesser amount of copolymer.

In the manufacture of seed mats of the type described, several additional properties of the coating are important. With respect to any seeds which are covered with the asphaltic material, the film strength of the coating must be sufficiently low to permit emergence of shoots or sprouts from the germinating seeds. A mean coating thickness of from 3 to 6 mils will generally be utilized, with the thickness of any coating which directly covers any seeds not exceeding 0.5 mil. Either the pure asphalt or asphalt-copolymer coating compositions can be used, although better growth rates have been observed in the case of Bermuda grass seed mats coated with blends of asphalt and ethylene-vinyl acetate copolymer, and particularly, blends containing about 10 weight percent of this copolymer. When this blend is applied by the curtain coating technique, about 75 percent of the seeds can be left exposed at the upper surface.

Many types of seeds may be utilized in the seed mats of the invention, including grass seeds and various types of row crops and small grain crops. The seel mats afford a particularly desirable way of planting seeds of this type, since the seeds are relatively small and a good member of them may be lost due to wind conditions when broadcast or not covered sufficiently with the soil.

It should be further noted that it is within the scope of the present invention to impregnate the matrix or substrate of the seed mat with certain beneficial chemicals, such as fertilizers, insecticides and fungicides, provided primarily that the biodegradable property of the substrate is not completely or substantially destroyed by the use of such additives impregnating the substrate.

As a final consideration which is applicable to both the mulch and seed-mat embodiments of the invention, it is preferable to apply by sprinkling or other suitable technique, a small amount of abrasion resistant material, such as zinc or magnesium stearates, to the coated substrate prior to forming it into rolls for shipment or storage. This aids in preventing blocking of the coating and reducing loss of the coating through abrasion by contact with the uncoated surface of the substrate in the rolls.

In using both the seed mats and mulches prepared in accordance with the present invention, the fibrous substrates with their associated bitumin-containing composition coatings are unrolled or otherwise suitably laid out in strip form on the soil surface with the coated side up. Positioning of the mulch or seed mats may be accomplished either manually or mechanically, and the strips are anchored by lumps of soil, pegs, or ridges of earth placed in position by methods well understood in the art. In the case of the mulch strips, the crops can usually be planted by punching holes through the mulch at the center thereof and planting the seeds through such holes.

In the case of a few crops, such as pineapples or sugar cane, which develop strong spikes in the course of their growth, provision of apertures or holes in the mulch is not required since the shoots of spikes of the growing plant will penetrate through the mulch. It should further be pointed out that although the highly preferred method of applying the asphaltic coating to the fibrous substrate is the curtain coating technique hereinbefore described, other, more conventional procedures may be utilized, provided that in the case of the purely asphaltic coatings a thin uniform layer not exceeding 3.5 mils in thickness (about 6 mils in thickness in the case of the seed mats) can be applied to the substrate without the occurrence of penetration of the coating into the substrate to a depth exceeding about 0.5 mil.

The following examples will serve to further explain the invention and demonstrate the advantages which are attributable thereto.

EXAMPLE 1

Various bitumin-containing compositions were applied to sheets of 20½ pound mill glazed sulfite paper with a heated drawknife while the paper was rested on a warm hotplate. The thickness of the applied coatings was calculated from the weight of the applied coating composition.

In testing the flexibility of the applied coatings, the coated compositions were bent on a radius of about 1/16 inch at room temperature and the extent of fracturing or cracking observed.

Blocking tests of the coating compositions were run by covering the coated sides of the mulch papers with a piece of clean paper. A pressure of about 0.5 p.s.i.g. was applied to the clean paper and retained for about seventeen hours at the temperatures selected for the blocking tests. The paper coverings were then pulled away from the mulch papers and the percentage of the loaded area to which bitumin adhered was recorded as the percent of blocking which occurred.

In some of the blocking tests, the coated mulch paper was dusted with talc of a known amount prior to covering with the clean blocking paper.

The results of these tests are set forth in Table I and the properties of the asphalts used in the tests are set forth in Table II.

TABLE I

| Composition of coating, weight percent: | | | | | | |
|---|---|---|---|---|---|---|
| Elvax 250 ethylene-vinyl acetate copolymer | 15 | 15 | | | | |
| Propane reduced asphalt | 85 | | | 100 | | |
| Cracked asphalt No. 1 | | 85 | | | | 100 |
| Blown roofing asphalt | | | 100 | | | |
| Cracked asphalt No. 2 | | | | | 100 | |
| Properties of coating on 20½ pound paper: | | | | | | |
| Thickness, mils | 1.05 | 1.67 | 1.86 | 1.47 | 0.91 | 0.73 |
| Flexibility | Good | Good | Good | Good | Good | |
| No talc: | | | | | | |
| Percent Blocking at 75° F | | | | None | None | None |
| Percent Blocking at 100° F | | | | 100 | 20–25 | 10–20 | None |
| Percent Blocking at 120° F | | | | 100 | 100 | 50 | 20–30 |
| Percent Blocking at 140° F | 100 | 100 | 100 | 100 | 100 | 100 |
| Talc adhering at 75° F., grams per square foot | .346 | .259 | .346 | .072 | .330 | .187 |
| Percent blocking at 75° F | | | None | None | None | None |
| Percent blocking at 100° F | | | None | None | None | None |
| Percent blocking at 120° F | | | Trace | 50 | 5–10 | None |
| Percent blocking at 140° F | 5–10 | Trace | 100 | 75 | 5–10 | Stain |
| Talc adhering at 140° F., grams per square foot | | .259 | .274 | .259 | .288 | .288 |

TABLE II

| | Asphalt | | | |
|---|---|---|---|---|
| | Propane reduced | Cracked No. 1 | Blown roofing | Cracked No. 2 |
| Softening point, °F | 175 | 182 | 208 | 151 |
| Penetration at 77° F. (100 grams and 5 seconds), in decimillimeters | 4 | 4 | 32 | 7 |
| Specific gravity | 1.098 | 1.135 | 1.076 | 1.141 |
| Ductility at 77° F. (5 cm./min.), in cm | 150+ | 150+ | 3 | 150+ |
| Viscosity at 300° F., in centistokes | 1,465 | 175 | | |

In referring to the data set forth in Tables I and II, it will be noted that cracked asphalt No. 1, which was an air blown asphalt derived from a catalytically cracked clarified oil having a boiling range of from about 500° F. to 600° F. demonstrated the best blocking properties of the three pure asphalt coatings. All of the tested asphalts showed relatively good flexibility. The addition of Elvax 250 copolymer to the asphaltic coating improved the blocking characteristics, as did the use of talc dusted on the surface of the mulch papers.

EXAMPLE 2

Coatings of the various bitumin-compositions described in Example 1 were applied in fairly thin (about 1 mil) films to mucilage-coated paper, and the paper then removed by soaking in water. None of the separated, unsupported films of asphaltic compositions could be lifted from the water without disintegrating, thus showing a complete lack of cohesion and tensile strength, and indicating that the coating of the mulch strips can be easily disintegrated and plowed under the soil after soil organisms have destroyed the paper substrate.

ment and allowed to dry. All of the samples were then examined microscopically and visually. The results of these examinations are summarized in Table III.

TABLE III

|  | Soil, 4 no. incubation | Miniaml Agar, 3½ no. incubation | Sabouraud Agar, 3½ no. incubation | Sabouraud Agar, 3½ no. incubation |
|---|---|---|---|---|
| Newsprint (not coated) | Intact but strength loss | Intact but strength loss | Intact but strength loss | Intact but strength loss. |
| Roofing paper | No damage | No damage | No damage | No damage. |
| Asphalt coated newsprint | Intact but strength loss | Intact but strength loss | Intact but strength loss | Intact but strength loss. |
| Asphalt impregnated newsprint | do | do | do | Do. |
| Kraft toweling (not coated) | Destroyed | do | do | Do. |
| Newsprint coated with asphalt and 5% Elvak 250.[1] | Intact but strength loss | do | do | Do. |
| Newsprint coated with asphalt and 10% Elvax 250. | do | do | do | do |
| Kraft toweling seed mat coated with asphalt and 5% Elvax 250. | Paper destroyed all strength lost. | Paper destroyed asphalt intact. | Paper destroyed all strength lost. | Do. |
| Kraft toweling seed mat coated with asphalt and 10% Elvax 250. | do | Paper destroyed all strength lost. |  | Do. |

[1] All percents are weight percent.

EXAMPLE 3

A number of tests were run upon mulches and seed mats prepared in accordance with the present invention in which these articles were subjected to artificially induced degradation for a period of two weeks. In the tests, the samples were subjected to intimate contact with an inoculum of relatively pure strains of cellulose decomposing fungi. In preparing the inoculum, cultures of Poria Nigrescems–4856, Chaetomium Funicolum–R49A, R–6 (fungi imperfecti), Phialophora Richardsiso–R–7, and R–21 (fungi imperfecti) were grown on Sabouraud's agar and the spores of these fungi were then harvested. The Sabouraud's agar is a semisolid medium specifically designed for fungal growth and consists of glucose, peptone, water and agar. A mixed spore suspension of these six cultures was then made in water and used to spray the mulch samples.

In some of the tests, mulch and seed mat sample discs about 2 inches in diameter were placed on top of Sabouraud's agar in petri dishes with the coated side up, and were then sprayed with the six culture inoculum. The plates were then incubated in a water saturated atmosphere at 25° C. In other tests, the discs were supported on a minimal agar sodium which consisted of:

$MgSO_4 \cdot 7H_2O$—0.2 g.
$(NH_4)_2SO_4$—0.2 g.
$Na_2HPO_4$—0.21 g.
$KH_2PO_4$—0.09 g.
$CaCl_2$—0.10 g.
Yeast extract—0.03 g.
Glucose—0.03 g.
pH—5.8
Agar—15.0 g.
$H_2O$—1 liter The minimal agar medium was used in some of the tests because in this medium, the organic content is so low as to be only stimulatory and not growth supporting. Thus, any significant fungal growth that took place did so as a result of using the mulch samples as food for the fungi. Incubation and inoculation of mulch samples on this medium was the same as with the Sabouraud's agar medium.

In a third series of artificially induced degradation tests, soil containing decaying organic debris was mixed with soil taken from a cattle feed lot and placed in small glass containers. Discs of the mulch were placed on the surface of the soil, then inoculated with spore suspension and incubated in the same manner as were the agar plates.

After 3½ to 4 months in the test environments, the mulch and seed mat samples, along with comparative uncoated paper samples and one sample of asphalt saturated roofing paper were removed from their test environment and allowed to dry. All of the samples were then examined microscopically and visually. The results of these examinations are summarized in Table III.

In referring to TABLE III, it will be noted that significant degradation was observed in the case of all of the samples except for the roofing paper sample which consisted of paper impregnated to saturation with asphalt.

In addition to the microscopic and visual examinations of the samples, tensile strength tests were made on the uncoated paper, mulch and seed mat samples that were removed intact from the soil and minimal agar environments. All of the samples thus tested showed significant strength losses. The asphalt impregnated newsprint, however, underwent a smaller decrease in strength than asphalt coated newsprint, thus indicating that penetration of the asphalt into the substrate to a relatively great extent should preferably be avoided. The newsprint coated solely with asphalt, as well as the newsprint mulches coated with blends of asphalt and the Elvax copolymer all compared favorably in degradation and loss of tensile strength to the uncoated newsprint, indicating that with the relatively thin and superficial coatings of the asphaltic compositions used in the present invention, the normal rate of deterioration of paper in contact with soil organisms is not detrimentally affected by the presence of the coating compositions thereon. In all of the samples tested, the asphalt employed was the air blown cracked asphalt hereinbefore described.

EXAMPLE 4

In order to better evaluate the physical properties of the asphalt containing coatings applied to cellulosic substrates using the curtain coating technique hereinbefore described, a number of tests were run in which various mulches and seed mats were prepared by the curtain coating procedure, and the coated samples then subjected to examination and testing which included measurement of the thickness of the applied coating, the contact and penetration of the coating on and into the substrate, the contact and thickness of the coating over the seeds utilized in the seed mat, the frequency of cracks in the coating, and the surface texture. The coated mulch and seed mat samples were compared with untreated substrates of the type used in preparing the mulches and seed mats. The asphalt used in all of the coating compositions was the air blown cracked asphalt hereinbefore described. The samples were examined in two ways. In the first of these, the surface of each of the samples was examined using a low power, 30 magnification stereoscopic microscope. In the second type of examination, cross sections of the samples were examined using a metallographic microscope at medium power from 200 to 340 magnification with reflected, polarized lighting. The cross sections were prepared by laying the samples with the coated side down on a firm, Masonite surface which was heated to about 45° C. This slightly elevated temperature reduced the brittleness of the coating to permit the samples to be more easily sectioned. Cutting of the samples was done with double-edged razor blades, and a new edge was used for each section.

The results obtained in these tests are set forth in Table IV along with a description of the type of substrate and coating composition used in each sample.

curred in the case of those mats coated with a 4 mil coating of the blend containing 10 weight percent of the Elvax 250. In these mats about 75 percent of the seeds

TABLE IV.—THICKNESS MEASUREMENTS IN MILS

| Sample | Paper [1] | Asphalt [1] | Total [1] | Asphalt [2] on seeds | Penetration of asphalt into paper | Frequency of exposed seeds | Frequency of surface cracks | Surface texture |
|---|---|---|---|---|---|---|---|---|
| Asphalt impregnated Newsprint | | | 3.8 | | Complete | None found | Low | Dull, variable. |
| Asphalt plus 10% Elvax 250 on Newsprint | 3.5 | 1.2 | 4.7 | | 0.46 | | Low | Some gloss, but variable. |
| Untreated Newsprint (—198–3) | 4.2 | | | | | | | Smoother than Nibroc. |
| Asphalt plus 5% Elvax [3] on Newsprint | 3.8 | 2.5 | 6.3 | | 0.4 avg | | High | Smooth. |
| Asphalt plus 10% Elvax on Newsprint | 3.4 | 2.0 | 5.4 | | 0.4–0.7 | | None found | Striated. |
| Asphalt plus 10% Elvax on Nibroc [4] Kraft Paper Toweling | 4.4 | 4.0 | 8.5 | [5] 3.0–0 | 0–0.4 | >75% | do | Rough and irregular. |
| Asphalt plus 5% Elvax on Nibroc Kraft Paper Toweling | 4.5 | 3.6 | 8.0 | 1.2–0 | 0–0.4 | Low | Highest, much chipping. | Smooth. |
| Untreated Nibroc Kraft Paper Toweling | 4.6 | | | | | | | Rough; ridges coarser fibers than newsprint. |
| Asphalt plus 5% Elvax on Nibroc Kraft Paper Toweling | 5.6 | 6.1 | 12.0 | 3.0 | 0–0.4 | Very low, none found. | High; some chipping. | Smooth. |
| Asphalt plus 5% Elvax on Nibroc Kraft Paper Toweling | 4.9 | 3.5 | 8.4 | 2.1–0 | Low, poor contact. | Low | do | Do. |
| Asphalt plus 10% Elvax on Nibroc Kraft Paper Toweling | 4.2 | 5.7 | 9.9 | 3.0–0 | Some stain on back. | 10–20% | Very low | Slightly rough. |
| Asphalt plus 10% Elvax on Nibroc Kraft Paper Towling | 4.9 | 2.8 | 7.7 | 1.0–0 | 0–0.4 | >50% | do | Do. |

[1] Average of 100 measurements.
[2] Average of 10 measurements.
[3] Elavx copolymer used in all blends was Elvax 250.
[4] Nibroc is a creped kraft paper toweling produced by N. I. Brown Paper Co.
[5] Only measurements of coated seeds were included in averages in column "Asphalt on Seeds."

From the data appearing in Table IV, it will be apparent that the newsprint substrate absorbed the coating material slightly more than did the Nibroc kraft paper toweling. It further appears that the substrate is compressed slightly by the coating process. It will be noted that the penetration of the asphalt into the substrate when employing the curtain coating procedure rarely exceeds about 10 percent of substrate thickness, and that the thickness of the applied coating can be relatively easily maintained under about 3 mils in the case of the mulch samples and about 6 mils in the case of the seed mat samples. Thus, the curtain coating procedure offers economic advantages in maintaining the coating relatively thin, and penetration at a relatively low value, and also permits the desired rate of biodegradation to be achieved by avoiding saturation and impregnation of the substrate with the applied coating material. It is further to be noted that the inclusion of the copolymer in the coating blend does not appear to measurably affect the depth of penetration of the blend into the substrate, with the figure of about 10 percent of the substrate thickness being penetrated applying generally.

Though a relatively low copolymer content (about 5 percent) is less effective in preventing chipping and cracking, it makes for a smoother coating than the blends containing 10 percent of the copolymer. On the other hand, it will be noted that in the case of the seed mats, the incidence of exposed or uncovered grass seeds which occurred when the coating composition containing 10 weight percent of the Elvax 250 copolymer was employed was considerably higher than the incidence of exposed grass seeds when the blend containing 5 percent of this copolymer was employed. Thus, in the case of seed mats prepared using a coating composition containing 10 weight percent of the Elvax 250, as high as 75 percent of the seeds remained exposed at their upper surface.

EXAMPLE 5

Bermuda grass seed mats prepared as described in Example 4 were placed in a greenhouse in an environment conductive to germination. Germination of the seeds was perceived to occur within ten days after placing the seed mats in contact with the soil. The best growth oc-
were exposed at their upper surface. This indicated that exposure of the upper surface of the seeds is desirable, and that use of blends containing 10 weight percent of the copolymer are to be preferred to the blends containing only 5 weight percent thereof for purposes of manufacturing the seed mats of the invention.

EXAMPLE 6

Field tests were conducted in which one of the mulches prepared by the curtain coating procedure and described in Example 4 was used for mulching a crop of muskmelons. This mulch comprised a newsprint having a thickness of about 3.5 mils coated with about 1.2 mils of air blown cracked asphalt containing 10 weight percent Elvax 250. The depth of penetration of the coating into the substrate was about 0.46 mil. For purposes of comparison, sheets of black pigmented polyethylene mulch paper having a thickness of 1.25 mils were used concurrently in the same field for mulching certain rows of the muskmelon crop. Tensile strength tests of the mulches prepared in accordance with the present invention were made prior to mulching the muskmelon crop, as well as after the mulch had been in use for a period of 103 days.

After the 103 day weathering period and following completion of the growing season of the muskmelons, it was observed that the mulches had deteriorated to an extent such that only selected areas could be lifted from the ground to provide strips of sufficient size to be subjected to tensile strength tests. Furthermore, only a few of the strips which were lifted from the ground were coherent enough to withstand handling during the tensile strength test. The polyethylene, on the other hand, was substantially intact and had undergone relatively little weakening. The plastic characteristics of the polyethylene was retained so that even after rototilling, long strips of the polyethylene remained in the soil and on the surface thereof. On the other hand, rototilling of the mulch of the present invention resulted in the complete disintegration of the mulch and comminution thereof into very small pieces.

Table V sets forth data from the tensile strength tests of the much of the present invention, showing the results of such tests obtained both before and after the weathering of the mulch during the 103 day maturing period of the muskmelon crop. The tensile strength tests were performed on an Instron tensile testing machine.

TABLE V.—EFFECT OF WEATHERING ON STRENGTH OF MULCH
[3.5 Mils Newsprint Coated with 1.2 Mils of Asphalt Blend Containing 10 Wt. percent Elvax 250]

| | |
|---|---|
| Average Tensile Elongation inches (E): | |
| Before mulcing (a) | 0.54 |
| After mulching for 103 Days (b) | 0.70 |
| Average Tensile Strength, lb. (T): | |
| Before mulching (a) | 10.4 |
| After mulching for 103 Days (b) | 4.7 |
| Toughness (ET/2): | |
| Before mulching (a) | 2.7 |
| After mulching for 103 Days (b) | 1.65 |
| Percent deterioration in toughness $100-100 \left(\dfrac{\frac{E_b T_b}{2}}{\frac{E_a T_a}{2}}\right)$ | 59.5 |
| Average Tear Strength, lb.: | |
| Before mulching | 8.0 |
| After mulching for 103 Days | 1.4 |
| Percent deterioration in tear strength $\left(100-\dfrac{b}{a}\right)$ | 30 |

Although certain preferred embodiments of the invention have been heretofore described by way of example, it will be understood that some modification and variation may be made in the proportions indicated, and in the materials to which reference has been specifically made, without departure from the basic principles which underlie the invention. Insofar as such modifications continue to rely upon the fundamental principles which are hereinbefore described, they are deemed to be circumscribed by the spirit and scope of the invention except as the same may be necessarily limited by the appended claims or reasonable equivalents thereof.

What is claimed is:

1. A seed mat for supporting and protecting seed during germination comprising:
   a fibrous, biodegradable substrate having seeds supported thereby adjacent one surface thereof; and
   a coating of a bituminous composition on said one surface and said coating partially surrounding said seeds and having a mean thickness not exceeding about 6 mils said bituminous composition comprises an asphalt having a softening point between about 175° F. and 190° F. and a penetration at 77° F. of between 1 and 10, with said coating impregrating only a minor portion of said substrate.

2. A seed mat as claimed in claim 1 wherein said seeds are embedded in said fibrous substrate.

3. A seed mat as claimed in claim 1 wherein said substrate is a creped paper, and said seeds are disposed in the depressions in said paper.

4. A seed mat as claimed in claim 1 wherein said bituminous composition comprises:
   from about 70 percent by weight to about 99 percent by weight asphalt; and,
   from about 1 percent by weight to about 30 percent by weight of an asphalt extendible copolymer selected from a group consisting of ethylene-vinyl acetate and ethylene-ethyl acrylate copolymers.

References Cited

UNITED STATES PATENTS

| | | | |
|---|---|---|---|
| 1,274,527 | 8/1918 | Eckart | 47—9 |
| 1,846,186 | 2/1932 | Cline et al. | 47—9 |
| 1,882,713 | 10/1932 | Angier | 47—9 |
| 1,931,248 | 10/1933 | Bryant | 47—9 |
| 1,971,504 | 8/1934 | Pratt | 47—56 |
| 2,648,165 | 8/1953 | Nestor | 47—56 |
| 2,927,402 | 3/1960 | Goren et al. | 47—9 XR |
| 3,080,681 | 3/1963 | Merrill et al. | 47—56 |
| 3,274,138 | 9/1966 | Salvesen | 47—9 XR |

ROBERT E. BAGWILL, Primary Examiner

UNITED STATES PATENT OFFICE
CERTIFICATE OF CORRECTION

Patent No. 3,516,196                Dated June 23, 1970

Inventor(s) Richard F. Lippoldt and Warren W. Woods

It is certified that error appears in the above-identified patent and that said Letters Patent are hereby corrected as shown below:

Column 1, line 33, "woods" should be -- weeds -- .
Column 4, line 48, "bar" should be -- but -- .
Column 5, line 16, "278" should be -- 276 -- .
Column 5, line 17, "30°C" should be -- 30°C$^1$ -- .
Column 5, line 29, "50T" should be -- 56T -- .
Column 7, line 63, "current" should be -- curtain -- .
Column 7, line 65, "this" should be -- the -- .
Column 8, line 48, "in" should be -- is -- .
Column 8, line 71, "seel" should be -- seed -- .
Column 11, line 31, "Richardsiso" should be -- Richandsiae -- .
Column 12, in Table III, heading "Soil, 4 no. incubation" should read -- Soil, 4 mo. incubation -- .
Column 12, in Table III, heading "Miniaml Agar, 3 1/2 no. incubation" should be -- Minimal Agar, 3 1/2 mo. incubation -- .
Column 12, in Table III, heading "Sabouraud Agar, 3 1/2 no. incubation" should be -- Sabouraud Agar, 4 mo. incubation -- .
Column 12, in Table III, heading "Sabouraud Agar, 3 1/2 no. incubation" should be -- Sabouraud Agar, 3 1/2 mo. incubation -- .
Column 12, in Table III, line 2, "Rooding" should be -- Roofing -- .
Column 12, in Table III, line 7, "Elvak" should be -- Elvax -- .
Column 13, in Table IV, in footnote 3, "Elavx" should be -- Elvax -- .
Column 15, in Table V, line 10, "59.5" should be -- 39.5 -- .
Column 15, in Table V, line 12, "8.0" should be -- 2.0 -- .

(SEAL)
Attest:

Edward M. Fletcher, Jr.
Attesting Officer

WILLIAM E. SCHUYLER, JR.
Commissioner of Patents